Figure 1:
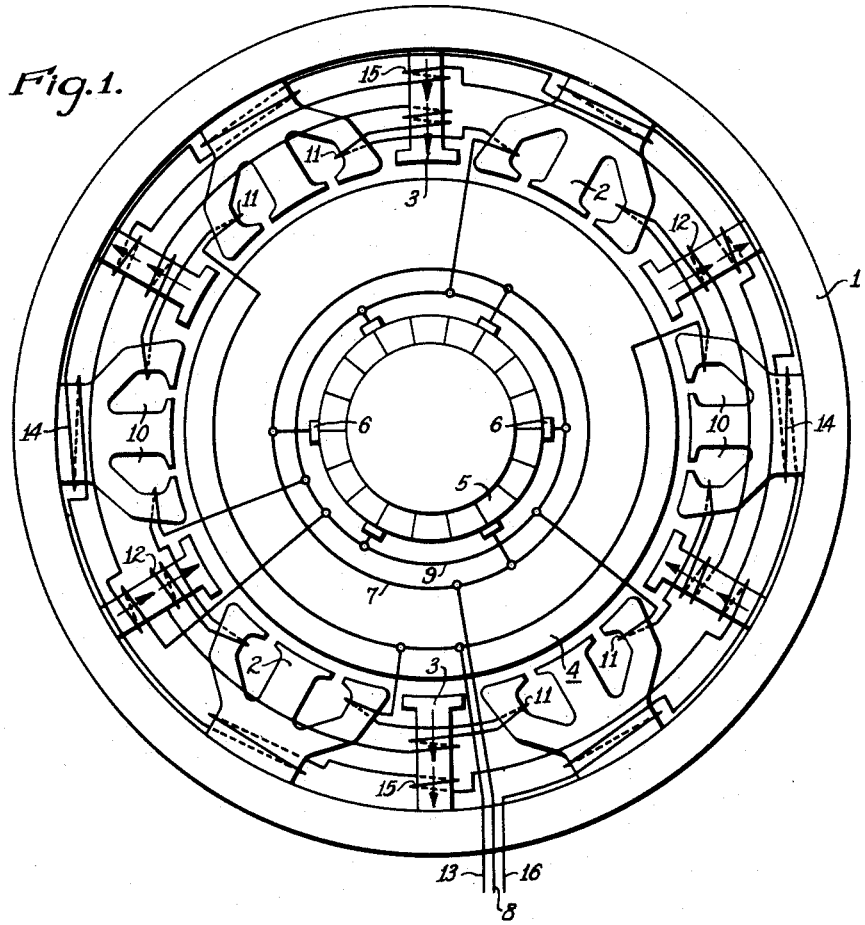

Nov. 21, 1950     J. D. MINER, JR     2,530,982
DIRECT CURRENT GENERATOR
Filed April 16, 1947

WITNESSES:
Robert C Baird
Thru. C. Groome

INVENTOR
John D. Miner, Jr.
BY
ATTORNEY

Patented Nov. 21, 1950

2,530,982

UNITED STATES PATENT OFFICE 2,530,982

DIRECT-CURRENT GENERATOR

John D. Miner, Jr., Lima, Ohio, assignor to Westinghouse Electric Corporation, East Pittsburgh, Pa., a corporation of Pennsylvania Application April 16, 1947, Serial No. 741,901

4 Claims. (Cl. 322—65)

The present invention relates to direct-current generators and, more particularly, to a generator which is capable of operation at its rated voltage over a relatively wide range of operating speeds.

The invention is especially suitable for use in direct-current aircraft generators, although its usefulness is obviously not restricted to this particular application. Aircraft generators, which supply the electrical loads on airplanes, are usually driven by a main engine of the airplane and, therefore, must be capable of operation at varying speeds. With some types of prime movers, the speed range may be relatively wide, and the generator must be capable of delivering as much output as possible over as wide a speed range as possible. Satisfactory operation at low speeds is also important, since the generator is often required to supply some loads when the engine which drives it is idling, or the airplane taxiing at low engine speed.

Voltage regulators are commonly used with aircraft generators to control the shunt field excitation to maintain the desired generator voltage, but when operation over a wide range of speeds is required, difficulty is encountered with generators of convention construction. The space available for the shunt field windings is quite limited in an aircraft generator, and the power available for shunt field excitation is also limited, because of the necessity of using a voltage regulator of small size and light weight, so that the maximum shunt field excitation obtainable is not sufficient to maintain the rated voltage at low speeds, and the generator voltage drops when the speed falls below a minimum speed which, in many cases, is higher than would be desirable.

Additional excitation can be obtained by means of a compound field winding, to provide greater total field flux than that obtainable from the shunt field winding alone, and by this means the minimum speed at which normal voltage can be maintained could be considerably lowered. A very effective means of obtaining compounding in a direct-current generator which is provided with interpoles and compensating windings, as most aircraft generators are, is to overexcite the commutating field windings on the interpoles, that is, to provide greater excitation than is needed merely to provide the necessary commutating field flux. A conventional cumulative series compound field winding cannot be used in an aircraft generator because if the generator were connected to the bus at standstill or when the generator voltage was below the bus voltage, reverse current would flow from the bus to the generator, and this current flowing through the series compound field winding would cause the generator to reverse its polarity. Furthermore, a series field which would be satisfactory at low speeds would produce overexcitation and instability at high speeds. For these reasons, a conventional series field winding cannot be used to provide compounding in an aircraft generator. Compounding by overexcitation of the commutating field windings, however, avoids the difficulty of polarity reversal when the generator is connected to the bus at standstill, since with this type of compounding, there is no compounding action at standstill.

Compounding by overexcitation of the commutating field is extremely effective at high speeds, since even a small amount of overexcitation generates a voltage which causes circulating currents in the armature coils which are short-circuited by the brushes. Since the resistance of the armature coils is relatively low, a considerable amount of compounding occurs, and the compounding action increases with speed. Compounding at high speeds of the generator is very undesirable in aircraft generators, however, because when the generator is operating at high speed, with very weak shunt field excitation, even a slight tendency towards compounding results in self-excitation of the generator by the compound field, with resultant loss of control by the voltage regulator, which affects only the shunt field. Even at speeds somewhat below those at which the regulator loses control, if there is any substantial amount of compounding, instability occurs if the shunt field current decreases with an increase in load, which is a condition that cannot readily be prevented in a machine having overexcited commutating windings. Thus, although compounding would be very desirable at low speeds to reduce the minimum speed at which normal voltage is obtainable, it is very undesirable at high speeds, because of the instability which it causes, and possible loss of control by the voltage regulator. For this reason, it has not been considered practical heretofore to provide compounding in direct-current aircraft generators, and the maximum range of speed over which normal voltage could be maintained has been seriously limited.

The principal object of the present invention is to provide a direct-current generator which is capable of maintaining normal voltage over a relatively wide range of operating speeds.

A further object of the invention is to provide a direct-current generator in which a considerable amount of compounding is provided at low speeds, but in which the compounding is reduced to a very small amount at high speeds, thus making possible operation at normal voltage over a much wider speed range than has been possible heretofore.

A more specific object of the invention is to provide a direct-current generator having interpoles which carry the usual commutating field windings, and which also carry auxiliary commutating field winds to provide overexcitation of the commutating field to obtain a compounding action. The auxiliary commutating field windings are excited so that their excitation varies with the main shunt field winding current, preferably by connecting the auxiliary commutating field windings in series with the main shunt field winding. In this way, a considerable amount of compounding is obtained at low speeds, but the compounding action is reduced to an extremely small amount at high speeds when the shunt field excitation is reduced.

Figure 2:
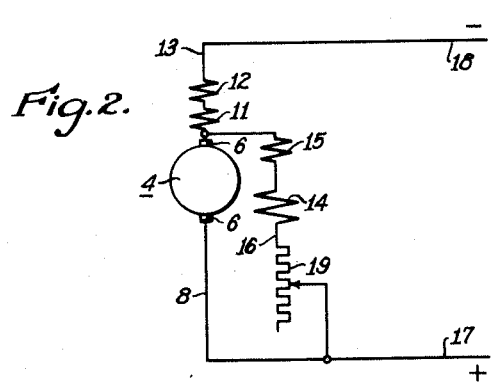

The invention will be more fully understood from the following detailed description, taken in connection with the accompanying drawing, in which:

Figure 1 is a somewhat diagrammatic end view of a direct-current generator embodying the invention; and Fig. 2 is a schematic diagram showing the connections of the generator windings.

The invention is shown in the drawing embodied in a typical direct-current aircraft generator. The machine shown, more or less diagrammatically, in Fig. 1 has a frame 1 on which are mounted a plurality of main pole pieces 2. A six-pole machine has been shown for the purpose of illustration, but it will be apparent that the invention may be applied equally well to machines having any other number of poles. Interpoles 3 are mounted on the frame 1 in the spaces between the main pole pieces 2 in the usual manner.

The generator has an armature or rotor member 4, which may have any usual or suitable type of armature winding, and which carries a commutator 5 which is engaged by brushes 6. In the six-pole machine shown, there are six brushes altogether, three of each polarity. The three brushes of one polarity, shown as the positive brushes, are connected together by a conductor 7 and connected to a terminal lead 8. The other three brushes, shown as the negative brushes, are connected together by a conductor 9.

The main pole pieces 2 have slots 10 formed in the pole faces, and compensating windings 11 are placed in the slots 10 to compensate for armature reaction in the usual manner. Commutating field windings 12 are placed on the interpoles 3 to provide the necessary commutating field, the windings 12 being designed to provide the correct commutating field flux for satisfactory commutation. The compensaating windings 11 and commuting field windings 12 are connected together in series between the conductor 9, which joins the negative brushes, and a terminal lead 13. In the particular machine shown, the compensating windings 11 and commutating field windings 12 are arranged in three paralleled circuits between the negative brushes and the terminal lead 13, in order to obtain the desired current in the individual windings. It will be understood, however, that the windings 11 and 12 might all be connected in series in a single circuit, as shown in Fig. 2, in which the compensating windings 11 and commutating field windings 12 have each been shown as a single winding, for simplicity of illustration.

Main shunt field windings 14 are placed on the main pole pieces 2 and connected in series, the windings on adjacent pole pieces being wound in opposite directions. Auxiliary commutating field windings 15 are placed on each of the interpoles 3, and the auxiliary commutating field windings 15 are connected in series with each other and with the main shunt field winding 14. The auxiliary windings 15 are connected so that they are cumulative with the commutating field windings 12, the directions of the fluxes of the windings 12 and 15 being as indicated by the arrows in Fig. 1. The series-connected main shunt field windings 14 and auxiliary commutating field windings 15 are connected between a terminal lead 16 and the conductor 9 which joins the negative brushes.

The connections of the generator to the external circuit are shown in Fig. 2. The lead 8 from the positive brushes is connected to the positive side 17 of the line which is to be supplied by the generator, and the lead 13 from the compensating and commutating field windings 11 and 12 is connected to the negative side 18 of the line. The lead 16 is connected to an external variable resistor or voltage regulator 19, the other side of which is connected to the positive line 17, so that the shunt field winding 14 and auxiliary commutating field winding 15 are connected across the armature 4. The variable resistor 19, which is utilized to control the current in the shunt field winding 14, is preferably controlled automatically in any suitable way in response to the generator voltage, and is to be taken as a diagrammatic representation of any suitable type of voltage regulator which maintains constant generator voltage by varying the shunt field current, the details of the regulator being omitted since it is not a part of the invention.

In the operation of this generator, when it is driven at relatively low speeds, the voltage regulator 19 increases the shunt field current, by reducing its resistance, to maintain the normal voltage, and this large shunt field current flowing through the auxiliary commutating field winding 15 provides a considerable amount of overexcitation of the commutating field. As explained previously, such overexcitation of the commutating field causes a very effective compounding action and thus supplies additional field flux, which makes it possible to maintain the normal voltage at speeds considerably lower than those at which the shunt field winding 14 alone could maintain normal voltage.

As the speed of the generator is increased, the voltage regulator 19 decreases the shunt field current and thus also decreases the amount of overexcitation of the commutating field. At high speeds, the field excitation necessary to produce normal voltage is very small, and the voltage regulator reduces the shunt field current to a very low value, so that the effect of the auxiliary commutating field windings 15 becomes negligibly small and there is no material amount of compounding. Thus the possibilities of instability, or of loss of control by the voltage regulator, due to compounding at high speeds as discussed above, are avoided, and satisfactory operation of the generator at normal voltage over a wide range of speeds is obtained. This result is produced by the use of the auxiliary commutating field windings 15 which produce a compounding effect by overexcitation of the commutating field, and this compounding effect varies smoothly and directly with the main shunt field current so that it is reduced to a negligible amount at high speeds, thus making it possible to provide considerable compounding at low speeds where it is needed, and substantially no compounding at high speeds where it is undesirable.

In some cases, it may be found desirable to also provide a differentially connected series field winding. The use of such a winding permits the utilization of greater commutating field flux to improve the commutation at high speeds, since the differential series field winding reduces the total field flux and thus prevents instability. At low speeds, the auxiliary commutaing field winding 15 overcomes the effect of the differential series field winding and provides the desired compounding as described above.

It should now be apparent that a simple and effective means has been provided for increasing the speed range over which aircraft generators can be operated at normal voltage. A particular embodiment of the invention has been shown and described for the purpose of illustration, but it will be obvious that various other embodiments and modifications are possible within the scope of the invention. Thus, the auxiliary commutating field windings 15 may be excited in any desired manner to cause their excitation to vary directly with the main shunt field current, although the series connection shown is probably the simplest way of obtaining this result. Various other modifications may be made within the scope of the invention and it is to be understood, therefore, that the invention is not limited to the specific details shown, but in its broadest aspects it includes all equivalent embodiments and modifications which come within the scope of the appended claims.

I claim as my invention:

1. A direct-current generator having a field member and an armature member, a main shunt field winding on the field member for providing a main field flux, a main commutating field winding on the field member, said main commutating field winding being connected in series with the armature and being adapted to provide the necessary commutating field flux for satisfactory commutation, an auxiliary commutating field winding on the field member, said auxiliary commutating field winding being cumulative with the main commutating field winding and being adapted to provide a flux in excess of that required for commutation, whereby a compounding effect is obtained, and means for exciting the auxiliary commutating field winding so that its excitation varies directly with the main shunt field winding current.

2. A direct-current generator having a field member and an armature member, a main shunt field winding on the field member for providing a main field flux, a main commutating field winding on the field member, said main commutating field winding being connected in series with the armature and being adapted to provide the necessary commutating field flux for satisfactory commutation, an auxiliary commutating field winding on the field member, said auxiliary commutating field winding being cumulative with the main commutating field winding and being adapted to provide a flux in excess of that required for commutation, whereby a compounding effect is obtained, and means for connecting the auxiliary commutating field winding in series with the main shunt field winding.

3. A direct-current generator having a field member and an armature member, a plurality of main pole pieces on the field member, a main shunt field winding disposed on the main pole pieces for providing a main field flux, a plurality of interpoles on the field member between the main pole pieces, a main commutating field winding disposed on the interpoles, said main commutating field winding being connected in series with the armature and being adapted to provide the necessary commutating field flux for satisfactory commutation, an auxiliary commutating field winding disposed on the interpoles, said auxiliary commutating field winding being cumulative with the main commutating field winding and being adapted to provide a flux in excess of that required for commutation, whereby a compounding effect is obtained, and means for exciting the auxiliary commutating field winding so that its excitation varies directly with the main shunt field winding current.

4. A direct-current generator having a field member and an armature member, a plurality of main pole pieces on the field member, a main shunt field winding disposed on the main pole pieces for providing a main field flux, a plurality of interpoles on the field member between the main pole pieces, a main commutating field winding disposed on the interpoles, said main commutating field winding being connected in series with the armature and being adapted to provide the necessary commutating field flux for satisfactory commutation, an auxiliary commutating field winding disposed on the interpoles, said auxiliary commutating field winding being cumulative with the main commutating field winding and being adapted to provide a flux in excess of that required for commutation, whereby a compounding effect is obtained, and means for connecting the auxiliary commutating field winding in series with the main shunt field winding.

JOHN D. MINER, Jr.

REFERENCES CITED

The following references are of record in the file of this patent:

UNITED STATES PATENTS

| Number | Name | Date |
| --- | --- | --- |
| 925,392 | Schley | June 15, 1909 |
| 1,237,306 | Darker | Aug. 21, 1917 |
| 1,910,473 | McNeil | May 23, 1933 |
| 2,166,187 | Stivender | July 18, 1939 |

FOREIGN PATENTS

| Number | Country | Date |
| --- | --- | --- |
| 80,396 | Austria | of 1920 |